No. 809,863. PATENTED JAN. 9, 1906.
D. TOSCANI.
COMBINED SEEDING AND MANURE SPREADING MACHINE.
APPLICATION FILED JUNE 29, 1905.

2 SHEETS—SHEET 1.

WITNESSES:
W. M. Avery
E. E. Ellis

INVENTOR
Domenico Toscani
BY
Munn
ATTORNEYS

No. 809,863. PATENTED JAN. 9, 1906.
D. TOSCANI.
COMBINED SEEDING AND MANURE SPREADING MACHINE.
APPLICATION FILED JUNE 29, 1905.
2 SHEETS—SHEET 2.
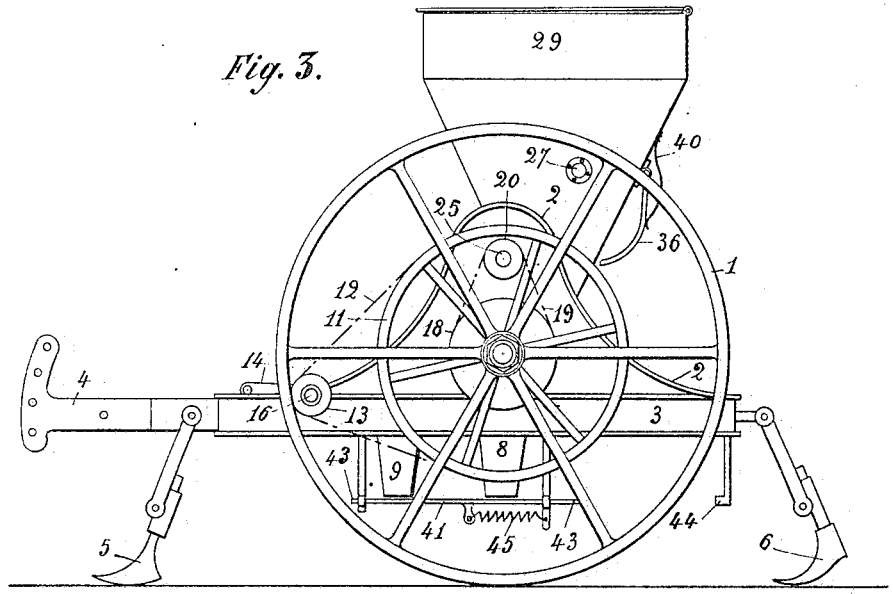
Fig. 3.
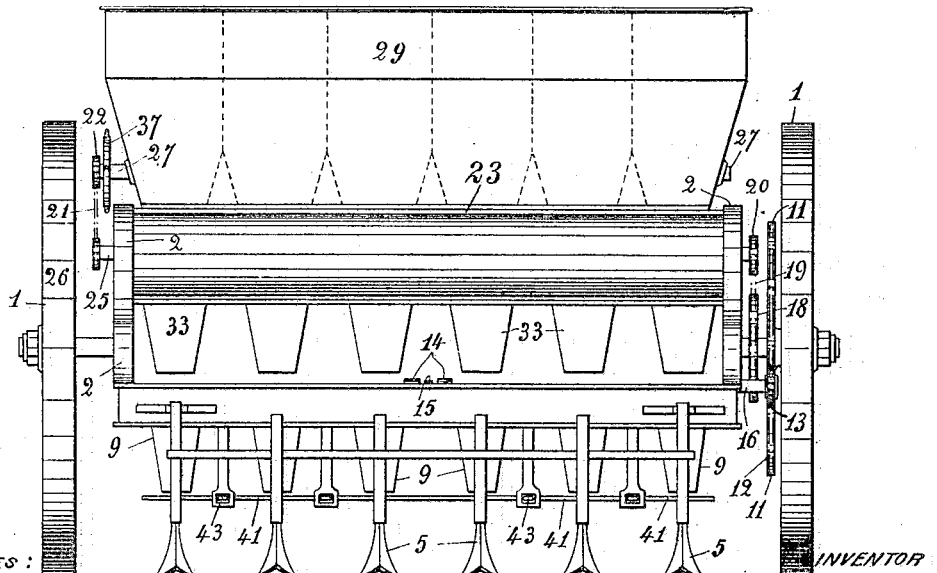
Fig. 4.
WITNESSES:
W. M. Avery
E. E. Ellis
INVENTOR
Domenico Toscani
BY 
ATTORNEYS

UNITED STATES PATENT OFFICE.

DOMENICO TOSCANI, OF ROCCA IMPERIALE, ITALY.

COMBINED SEEDING AND MANURE-SPREADING MACHINE.

No. 809,863.        Specification of Letters Patent.        Patented Jan. 9, 1906.

Application filed June 29, 1905. Serial No. 267,520.

*To all whom it may concern:*

Be it known that I, DOMENICO TOSCANI, a subject of the King of Italy, and a resident of Rocca Imperiale, Province of Cosenza, in the Kingdom of Italy, have invented certain new and useful Improvements in a Combined Seeding and Manure-Spreading Machine, of which the following is a specification.

The object of my invention is a combined seeding and manure-spreading machine which opens furrows in the ground to receive the grains or seeds, spreads in said furrows the seeds at equidistant intervals, together with the manure necessary for their successive development, and then covers the seeds and the manure spread in the bottom of the furrows.

Figure 1:
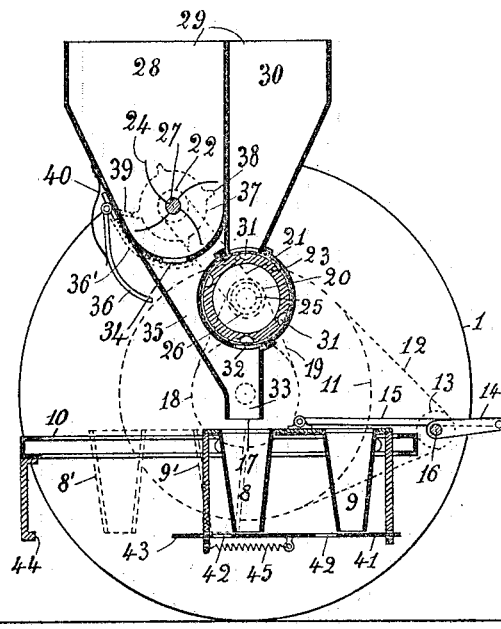
Figure 2:
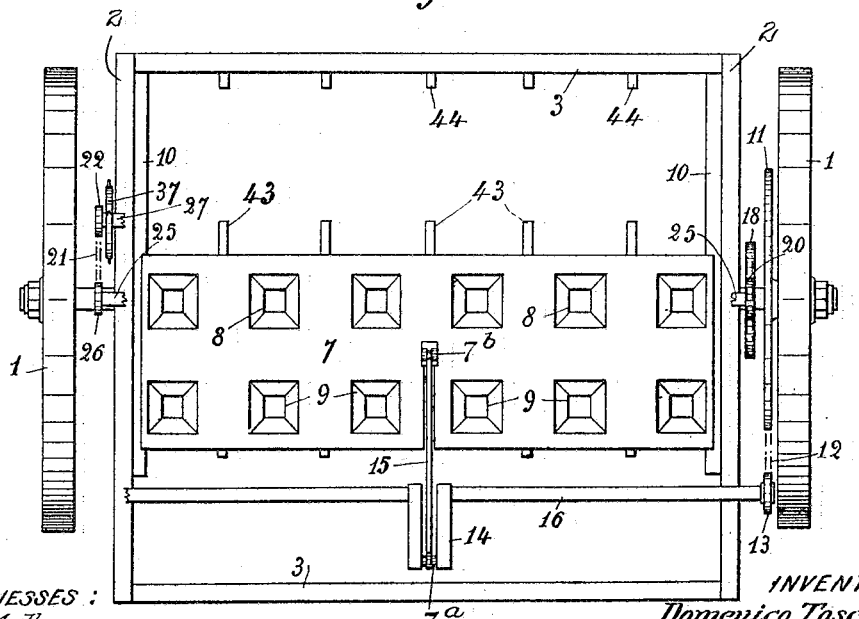

In the annexed drawings, which illustrate the invention, Figure 1 is a partial longitudinal section of the machine, showing the driving-gear. Fig. 2 is a top view of the same without the distributing-box. Fig. 3 is a side view and Fig. 4 a front view.

The cart rests on two carrying-wheels 1, journaled to the side bars 2 of the frame, which are connected together by means of the transverse pieces 3. In front of the cart the shaft is fixed to a fork 4. The plows or furrow-openers 5 and the spades or coverers 6, provided at the front and rear end of the cart, are intended for opening the furrows in the ground and covering the seeds in the usual way. Within the cart-frame is slidably mounted another and movable frame 7, provided with two rows of hoppers 8 and 9. On one of the wheels 1 of the cart is mounted the chain-wheel 11. A chain 12 connects the wheel 11 with the pinion 13, mounted on the shaft 16, which extends across the front of the cart and is journaled in the side bars 2. The middle portion of the shaft 16 is bent, forming the gooseneck 14, by means of which the connecting-rod 15 is attached to the movable frame 7 and causes it to slide to and fro, said connecting-rod having movable connections with said gooseneck and frame, as indicated at 7ª and 7ᵇ, respectively, Fig. 2.

In the position shown in Fig. 1 the hoppers 8 are beneath the openings 17, which will be treated of farther on. On the rotation of the shaft 16 the hoppers 8 will advance to the left, and those numbered 9 will assume the position beneath the openings 17; but at this time the frame 7 has not yet ended its course. It still advances in some degree until the hoppers assume the positions 8' and 9'. (Indicated by dotted lines in Fig. 1). After that the frame returns and again resumes the initial position.

On the axle of wheel 1, mentioned above, is mounted the chain-wheel 18, which by means of the chain 19 acts on the pinion 20, which rotates the drum 23. The shaft 25 of pinion 20 carries at its other end a pinion 26, which by means of the chain 21 effects the rotation of pinion 22, fitted to the shaft 27, which extends throughout the large box 28, causing the stirrers within the latter to act.

The feeding-box 29 for distributing the seed and the manure is fixed to the frame of the cart and is divided into two compartments— namely, the aforesaid large box 28 for the manure and the box 30 of lesser dimensions, containing the seed. The box 30 has below a cylindrical chamber within which the drum 23 fits exactly. This drum is provided with as many series of seed-cups 31 as there are rows of hoppers. According to the drawings the series are six in number and each series is contained in the vertical plane passing through the axes of the corresponding hoppers beneath. The cylindrical chamber below box 30 has underneath the openings 32, which are in the same plane of the seed-cups 31, which openings communicate with the vertical channels 33, whose openings 17 are so located as to correspond to the hoppers which pass beneath them. The seed-cups 31 receive the seed from box 30 and their capacity must be such as to suit the exigencies of the sowing operations to be performed. By means of the rotation of drum 23 the seed is conveyed through channel 33 to hoppers 8 and 9 alternately.

The drum 23 by reason of the ratio of the diameters of the wheels transmitting the motion has an angular velocity amounting to one-half of that of shaft 16, so that when the platform 7 has performed its entire course both backward and forward the drum 23 has only performed half a rotation. In Fig. 1 the drum 23 is shown in the position for discharging the seed from one line of its seed-cups 31 into the line of hoppers 8. Soon after this the other line of seed-cups 31 will empty the seed into the line of hoppers 9. Then the platform 7 must advance in a forward direction and then move backward without any further discharge of seed being effected.

The large box is furnished with the stirrer, without which the manure, which is apt to ball up, would not pass down smoothly. At the bottom of the large box there are the openings 34, which communicate with the channel 35. This channel is merged with channel 33. Normally the openings 34 are kept closed by flap-valves 36'. (Indicated by dots in Fig. 1.) To the shaft 27 of the stirrer 24 is fitted the disk 37, furnished with teeth 38, which act on the arms 39, connected to the flap-valves 36' and open them, causing them to assume the full-line position illustrated in Fig. 1, letting fall a portion of the manure. The spring 40 immediately afterward closes the valves. The distribution of the teeth 38 on the periphery of disk 37 is so regulated that the flap-valves or doors open just when the hoppers 8 and 9 are under the channels 33.

The hoppers 8 and 9 are open at the lower end. Against the lower openings of the hoppers is slidably mounted a plate or cut-off 41 with holes 42, and by means of said plate the openings of the hoppers are normally kept closed. The plate has projections 43, arranged to strike at the end of its course against repellers 44, which compel the plate to stop while the frame, with the hoppers, advances a little farther, until the holes 42 come under the openings of the hoppers and the seeds and the manure fall into the furrows. Then the frame, with the hoppers, begins its backward motion, and the spring 45 compels the plate 41 to resume its normal position, thereby shutting the openings of the hoppers.

The working of the machine is easily understood. By means of the cart's movement an alternate movement is imparted to frame 7, which performs its appointed course partly in one direction and partly in the other. In the forward movement the hoppers pass successively under the channels which supply the seed and the manure just when the distribution of each of the latter takes place. At the end of one half of the course the discharge onto the ground is effected. During the other half the hoppers pass under the feeding-channel; but they receive neither the seed nor the manure. The apparatus at the end of its appointed course is ready to recommence its operations in the same manner set forth above.

I claim—

1. A seeding and manure-spreading machine comprising a movable frame, with two lines of hoppers, made to slide under a fixed feeding-box containing the seed and the manure, a plate sliding under the lower ends of the hoppers and provided with holes through which the seed and manure fall, means for discharging the seed, and the manure from the box into the hoppers and means whereby at the end of the course of the movable frame with the hoppers, the plate with the holes is caused to stop and its hole to come in correspondence with the openings of the hoppers.

2. A seeding and manure-spreading machine, comprising a stationary box having compartments for containing the seed and manure, each having an opening in its bottom, a chamber beneath and communicating with the seed-compartment, a channel beneath and communicating with said chamber, a rotatable drum within the chamber, having cups for receiving seed from the seed-compartment and delivering them to said channel, another channel leading from the opening in the bottom of the manure-compartment to said first-named channel, and a reciprocatory frame supported beneath the first-named channel, provided with sets of hoppers disposed a suitable distance apart.

3. A seeding and manure-spreading machine, comprising a stationary box having compartments for containing the seed and manure, each having an opening in its bottom, a chamber beneath and communicating with the seed-compartment, a channel beneath and communicating with said chamber, a rotatable drum within the chamber, having cups for receiving seed from the seed-compartment and delivering them to said channel, another channel leading from the opening in the bottom of the manure compartment to said first-named channel, and a reciprocatory frame supported beneath the first-named channel, provided with sets of hoppers disposed a suitable distance apart, said hoppers being provided with a spring-controlled valve-plate associated with the outlets thereof.

Signed by me at Rome, in the Kingdom of Italy, this 13th day of June, 1905.

DOMENICO TOSCANI.

Witnesses:
W. MANEDETTI,
LETTERIO LABOCCETTA.